(12) United States Patent
Uchiyama (10) Patent No.: US 10,670,953 B2
(45) Date of Patent: Jun. 2, 2020

(54) LIGHT SOURCE DEVICE AND PROJECTOR

(71) Applicant: SEIKO EPSON CORPORATION, Tokyo (JP)

(72) Inventor: Shoichi Uchiyama, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/445,324

(22) Filed: Jun. 19, 2019

(65) Prior Publication Data

US 2019/0391473 A1 Dec. 26, 2019

(30) Foreign Application Priority Data

Jun. 20, 2018 (JP) ................. 2018-116907

(51) Int. Cl.
*G03B 21/20* (2006.01)
*H04N 9/31* (2006.01)

(52) U.S. Cl.
CPC ....... *G03B 21/204* (2013.01); *G03B 21/2073* (2013.01); *H04N 9/3158* (2013.01); *H04N 9/3161* (2013.01)

(58) Field of Classification Search
CPC . G03B 21/204; G03B 21/2073; H04N 9/3161
USPC ......................................................... 353/20
See application file for complete search history.

(56) References Cited

U.S. PATENT DOCUMENTS

2016/0353069 A1  12/2016 Chikahisa
2018/0157050 A1*  6/2018 Liao ..................... H04N 9/3129

FOREIGN PATENT DOCUMENTS

JP   2016-224304 A   12/2016

* cited by examiner

*Primary Examiner* — Jerry L Brooks
(74) *Attorney, Agent, or Firm* — Oliff PLC (57) ABSTRACT

A light source device is provided with a blue laser emitting element, a red laser emitting element, a phosphor, a polarization split element having a polarization split function with respect to blue light and red light, and a diffusion element. The blue light emitted from the blue laser emitting element enters the polarization split element to be split into a first blue polarization component and a second blue polarization component. The first blue polarization component enters the diffusion element to turn to blue diffused light. The phosphor is excited by the second blue polarization component to emit fluorescence, and the red light emitted from the red laser emitting element enters the diffusion element to be diffusely transmitted to turn to red diffused light. The blue diffused light, the red diffused light and a part of the fluorescence are combined with each other, and then emitted from the polarization split element.

18 Claims, 4 Drawing Sheets

LIGHT SOURCE DEVICE AND PROJECTOR

The present application is based on, and claims priority from JP Application Serial Number 2018-116907, filed Jun. 20, 2018, the disclosure of which is hereby incorporated by reference herein in its entirety.

BACKGROUND

1. Technical Field

The present disclosure relates to a light source device and a projector.

2. Related Art

In recent years, there is a technology of generating illumination light by combining a blue laser beam and fluorescence generated by excitation with the blue laser beam with each other as a light source device used for a projector. For example, in JP-A-2016-224304, there is disclosed a light source device which combines yellow fluorescence, a blue laser beam and a red laser beam with each other to generate white light.

In the light source device described above, the fluorescence is transmitted through a combining mirror and the red laser beam is reflected by the combining mirror, and thus the two light beams are emitted in the same direction to thereby generate illumination light.

Here, in the case of, for example, increasing the transmittance of the combining mirror for the red component included in the fluorescence, the red laser beam transmitted through the combining mirror increases, and thus, the light loss caused in the red laser beam increases. In contrast, in the case of, for example, increasing the reflectance of the combining mirror for the red laser beam, an amount of the red component included in the fluorescence and reflected by the combining mirror increases, and thus, the light loss caused in the fluorescence increases. As described above, in the light source device described above, there is a problem that the loss always occurs in either one of the red component of the fluorescence and the red laser beam. Further, in the light source device described above, since a plurality of diffusion plates is used, there is also a problem that the cost increases.

SUMMARY

A light source device according to an aspect of the present disclosure includes a blue laser emitting element configured to emit blue light, a red laser emitting element configured to emit red light having a predetermined wavelength band, a phosphor excited by excitation light to emit fluorescence, a polarization split element having a polarization split function with respect to the blue light and the red light having the predetermined wavelength band, and a diffusion element including a diffusion layer configured to diffuse incident light, and a dichroic layer configured to reflect the blue light and transmit the red light, wherein the blue light emitted from the blue laser emitting element enters the polarization split element to be split into a first blue polarization component and a second blue polarization component, the first blue polarization component enters the diffusion element to be diffusely reflected to turn to blue diffused light, the second blue polarization component enters the phosphor as the excitation light, the phosphor is excited by the second blue polarization component to emit the fluorescence, the red light emitted from the red laser emitting element enters the diffusion element to be diffusely transmitted to turn to red diffused light, and the blue diffused light, the red diffused light and the fluorescence enter the polarization split element, and the blue diffused light, the red diffused light and a part of the fluorescence are combined with each other, and then emitted from the polarization split element.

In the light source device according to the above aspect, the fluorescence emitted from the phosphor may include red light and green light, the red light included in the fluorescence may include a first red fluorescence component having a predetermined wavelength band, and a second red fluorescence component having a wavelength other than the predetermined wavelength band, and the polarization split element may perform polarization split on the first red fluorescence component.

In the light source device according to the above aspect, the first red fluorescence component may be split by the polarization split element into a first red polarization component and a second red polarization component.

In the light source device according to the above aspect, a part of the fluorescence may be formed of the green light, the second red fluorescence component and the first red polarization component.

The light source device according to the above aspect may include a first wave plate disposed between the polarization split element and the diffusion element, and second wave plate which is disposed between the diffusion element and the red laser emitting element, and which the red light emitted from the red laser emitting element enters.

In the light source device according to the above aspect, the blue light emitted from the blue laser emitting element may be transmitted through the first wave plate, and may be provided with a phase difference of a quarter wavelength by the first wave plate, and the red light emitted from the red laser emitting element may be transmitted through the second wave plate and the first wave plate, and may be provided with a phase difference of a half wavelength by the second wave plate and the first wave plate.

In the light source device according to the above aspect, the diffusion layer may include a first diffusion plate disposed on at incident side of light from the red laser emitting element in the dichroic layer, and a second diffusion plate located at an incident side of light from the blue laser emitting element in the dichroic layer.

In the light source device according to the above aspect, a direction in which the light from the red laser emitting element enters the polarization split element may be an opposite direction to a direction in which the light from the blue laser emitting element enters the polarization split element.

In the light source device according to the above aspect, the red laser emitting element and the blue laser emitting element may be disposed so as to face each other across the polarization split element.

A projector according to another aspect of the present disclosure includes the light source device according to the above aspect, a light modulation device configured to modulate light from the light source device in accordance with image information to thereby form image light, and a projection optical system configured to project the image light.

DESCRIPTION OF AN EXEMPLARY EMBODIMENT

Hereinafter, an embodiment of the present disclosure will be described using the drawings.

Figure 1:
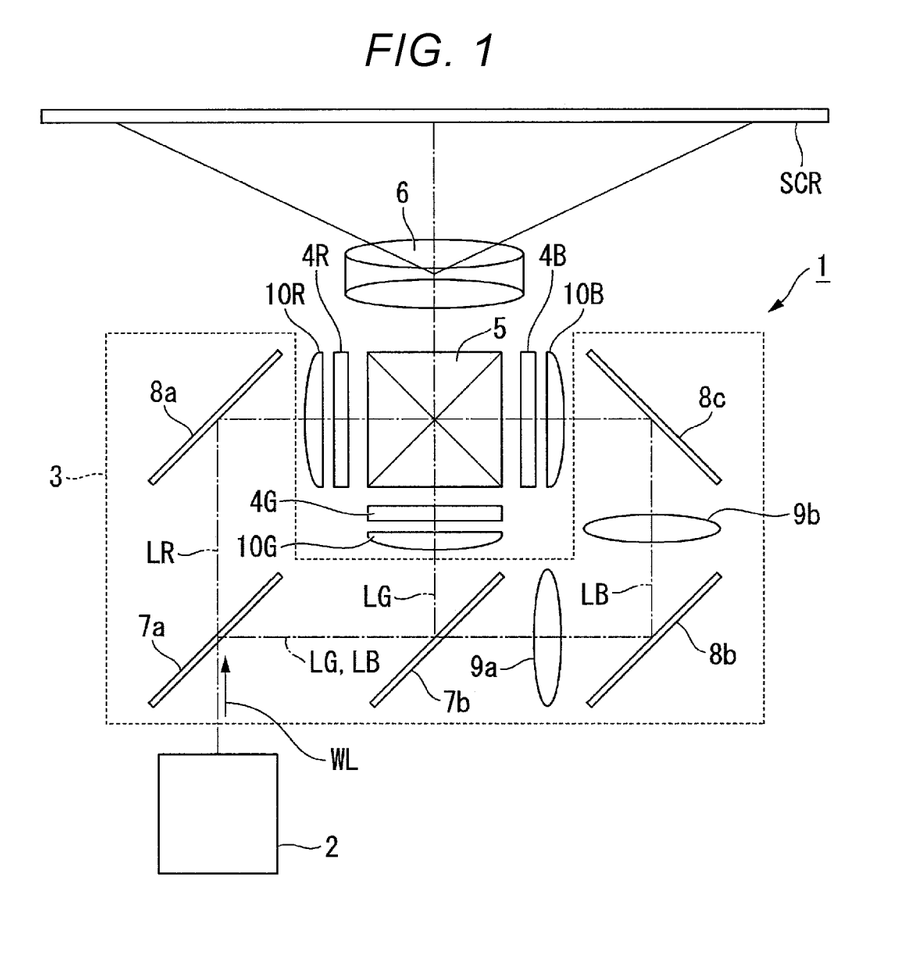
FIG. 1 is a schematic configuration diagram of a projector according to an embodiment.

FIG. 1 is a schematic configuration diagram of a projector according to the present embodiment.

As shown in FIG. 1, the projector 1 according to the present embodiment is a projection-type image display device for displaying a color image on a screen SCR. The projector 1 is provided with a light source device 2, a color separation optical system 3, a light modulation device 4R, a light modulation device 4G, a light modulation device 4B, a combining optical system 5, and a projection optical system 6.

The light source device 2 according to the present embodiment emits white illumination light WL toward the color separation optical system 3. The color separation optical system 3 separates the illumination light WL from the light source device 2 into red light LR (e.g., light in a wavelength band of 600 nm through 700 nm), green light LG (e.g., light in a wavelength band of 500 nm through 600 nm), and blue light LB (e.g., light in a wavelength band of 440 nm through 470 nm).

The color separation optical system 3 is generally provided with a first dichroic mirror 7a and a second dichroic mirror 7b, a first total reflection mirror 8a, a second total reflection mirror 8b and a third total reflection mirror 8c, and a first relay lens 9a and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the rest of the light (the green light LG and the blue light LB). Meanwhile, the second dichroic mirror 7b reflects the green light LG and at the same time transmits the blue light LB to thereby separate the rest of the light into the green light LG and the blue light LB.

The first total reflection mirror 8a is disposed in the light path of the red light LR, and reflects the red light LR, which has been transmitted through the first dichroic mirror 7a, toward the light modulation device 4R. Meanwhile, the second total reflection mirror 8b and the third total reflection mirror 8c are disposed in the light path of the blue light LB to guide the blue light LB, which has been transmitted through the second dichroic mirror 7b, to the light modulation device 4B. The green light LG is reflected by the second dichroic mirror 7b toward the light modulation device 4G.

The first relay lens 9a is disposed between the second dichroic mirror 7b and the second total reflection mirror 8b in the light path of the blue light LB. The second relay lens 9b is disposed between the second total reflection mirror 8b and the third total reflection mirror 8c in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, on the incident side and the exit side of each of the liquid crystal panels, there are respectively disposed polarization plates (not shown). Hereinafter, the light modulation device 4R, the light modulation device 4G and the light modulation device 4B are simply referred to as the light modulation devices 4R, 4G and 4B.

Further, on the incident side of the light modulation devices 4R, 4G and 4B, there are respectively disposed a field lens 10R, a field lens 10G and a field lens 10B. The field lens 10R, the field lens 10G and the field lens 10B respectively make the red light LR, the green light LG and the blue light LB entering the respective light modulation devices 4R, 4G and 4B telecentric.

The image light from each of the light modulation devices 4R, 4G and 4B enters the combining optical system 5. The combining optical system 5 combines the image light corresponding to the red light LR, the image light corresponding to the green light LG, and the image light corresponding to the blue light LB with each other, and then emits the image light thus combined toward the projection optical system 6. As the combining optical system 5, there is used, for example, a cross dichroic prism.

The projection optical system 6 is constituted by a projection lens group, and projects the image light combined by the combining optical system 5 toward the screen SCR in an enlarged manner. Thus, the color image enlarged is displayed on the screen SCR.

Light Source Device

Figure 2:
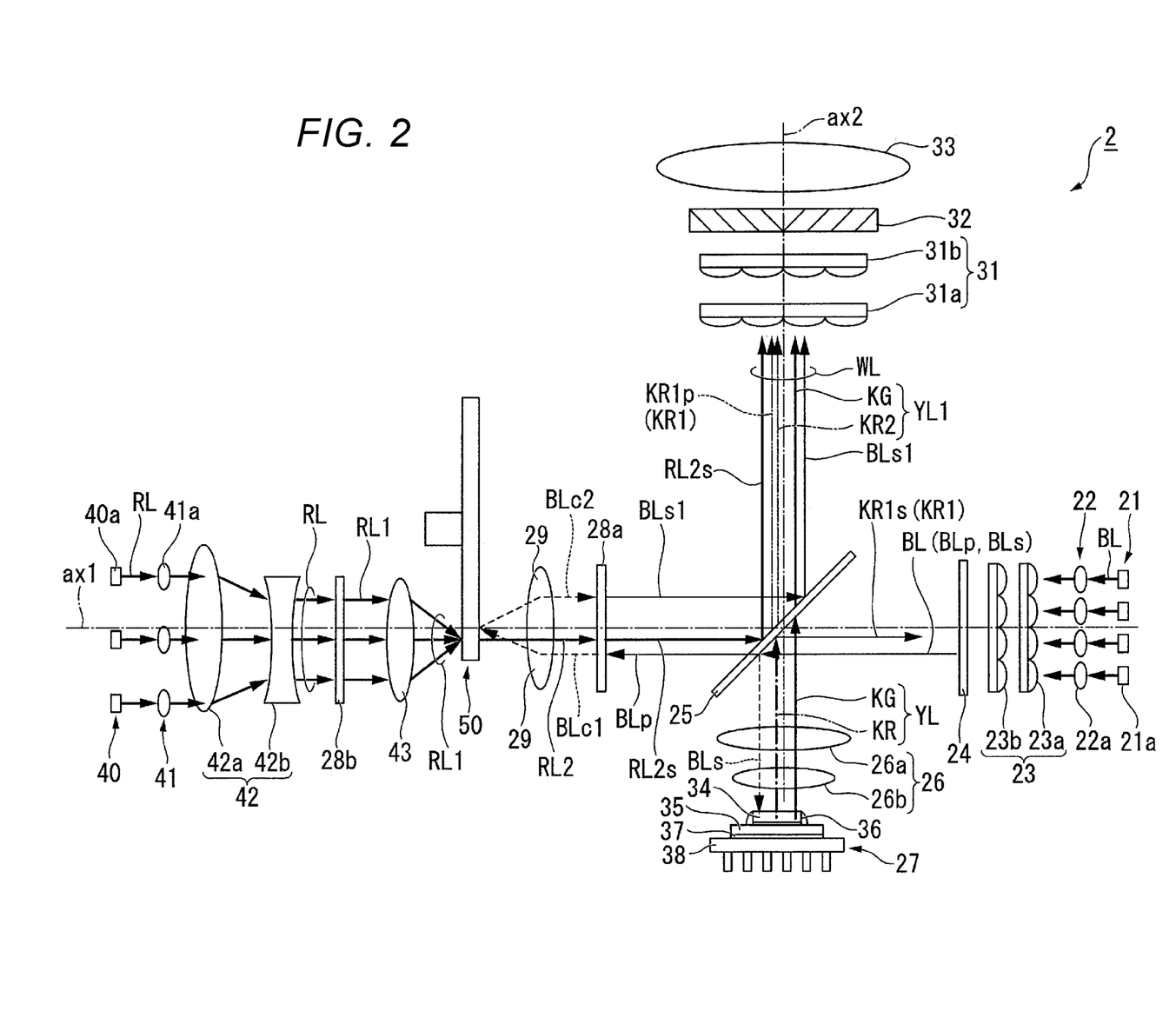
FIG. 2 is a diagram showing a schematic configuration of a light source device.

Then, the light source device 2 will be described. FIG. 2 is a diagram showing a schematic configuration of the light source device. As shown in FIG. 2, the light source device 2 is provided with a blue array light source 21, a first collimator optical system 22, a homogenizer optical system 23, a wave plate 24, a polarization beam splitter (a polarization splitting/combining element) 25, a first light collection optical system 26, a fluorescence emitting element 27, a first wave plate 28a, a second light collection optical system 29, a diffusion element 50, a red supplementary light source 40, a second collimator optical system 41, an afocal optical system 42, a second wave plate 28b, a third light collection optical system 43, a lens integrator 31, a polarization conversion element 32, and a superimposing lens 33.

The blue array light source 21, the first collimator optical system 22, the homogenizer optical system 23, the wave plate 24, the polarization beam splitter 25, the first wave plate 28a, the second light collection optical system 29, the diffusion element 50, the third light collection optical system 43, the second wave plate 29b, the afocal optical system 42, the second collimator optical system 41, and the red supplementary light source 40 are arranged in series on a light axis ax1 of the blue array light source 21. The light axis of the red supplementary light source 40 coincides with the light axis ax1 of the blue array light source 21.

Further, the fluorescence emitting element 27, the first light collection optical system 26, the polarization beam splitter 25, the lens integrator 31, the polarization conversion element 32 and the superimposing lens 33 are arranged in series on an illumination light axis ax2. The light axis ax1 and the illumination light axis ax2 are located in the same plane, and are perpendicular to each other.

The blue array light source 21 is provided with a plurality of blue laser emitting elements 21a. The plurality of blue laser emitting elements 21a is arranged in an array in a plane perpendicular to the light axis ax1. The blue laser emitting elements 21a each emit, for example, a light beam BL (e.g., a blue laser beam in a wavelength band of 440 nm through 470 nm) as the blue light.

The light beams BL emitted from the blue array light source 21 enter the first collimator optical system 22. The first collimator optical system 22 converts the light beams BL emitted from the blue array light source 21 into parallel light. The collimator optical system 22 is constituted by, for example, a plurality of collimator lenses 22a arranged in an array. The collimator lenses 22a are disposed so as to correspond respectively to the blue laser emitting elements 21a.

The light beams BL having passed through the first collimator optical system 22 enter the homogenizer optical system 23. The homogenizer optical system 23 includes multi-lenses 23a, 23b. The homogenizer optical system 23 homogenizes the illuminance distribution in an area to be illuminated (a phosphor 34) in cooperation with the first light collection optical system 26. Further, the homogenizer optical system 23 homogenizes the illuminance distribution in an area to be illuminated (the diffusion element 50) in cooperation with the second light collection optical system 29.

The light beams BL having been transmitted through the homogenizer optical system 23 enter the wave plate 24. The wave plate 24 is, for example, a half-wave plate arranged rotatably. The light beams BL emitted from the blue laser emitting elements 21a are each linearly polarized light. By appropriately setting the rotational angle of the wave plate 24, light beams including S-polarized light and P-polarized light with respect to the polarization splitter 25 described later at a predetermined ratio can be obtained as the light beams BL transmitted through the wave plate 24. By rotating the wave plate 24, it is possible to change the ratio between the S-polarized light and the P-polarized light.

The light beams BL, which are generated by passing through the wave plate 24, and include the S-polarized light and the P-polarized light, enter the polarization beam splitter 25. The polarization beam splitter 25 is disposed so as to form an angle of 45° with the light axis ax1 and the illumination light axis ax2.

Incidentally, the light source device 2 according to the present embodiment is arranged to supplement the red component (the red light LR) of the illumination light WL with the light emitted from the red supplementary light source 40. Thus, it becomes possible to display the white light having an optimum white balance by supplementing the red component of the display image in the projector 1. The red supplementary light source 40 has a plurality of red laser emitting elements 40a. It should be noted that the number of the red laser emitting elements 40a is not particularly limited.

In the present embodiment, the red laser emitting elements 40a each emit a red supplementary light beam (the red light) RL having a predetermined wavelength band. Specifically, the red supplementary light beam RL is a laser beam having a peak wavelength in a range of, for example, 635 nm through 645 nm. Further, the red supplementary light beam RL is linearly polarized light, and corresponds to the P-polarized light with respect to the polarization beam splitter 25 described later. In other words, the red laser emitting elements 40a each emit the light having the same polarization direction as the P-polarized light (the light beam BLp) of the light beam BL obtained by performing the polarization split in the polarization beam splitter 25 as the red supplementary light beam RL.

Figure 3:
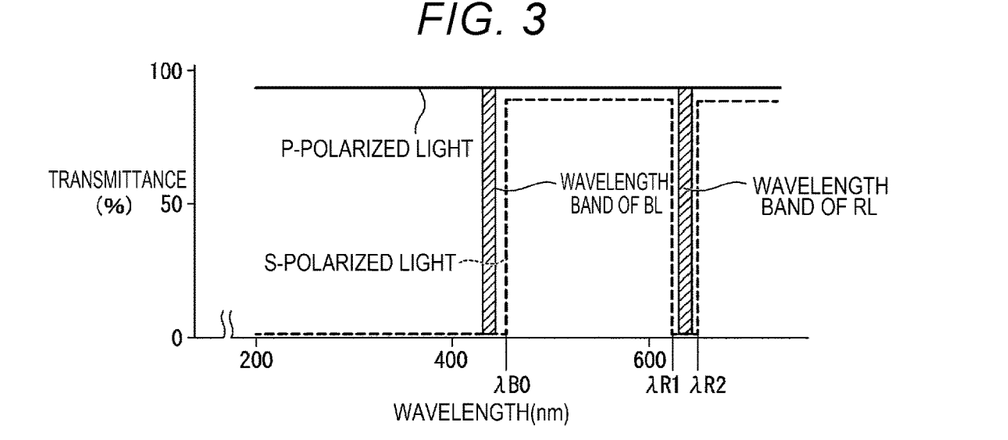
FIG. 3 is a diagram showing a spectral transmittance characteristic of a polarization beam splitter.

FIG. 3 is a diagram showing a spectral transmittance characteristic of the polarization beam splitter. In FIG. 3, the vertical axis represents the transmittance of the polarization beam splitter, and the horizontal axis represents the wavelength of the light entering the polarization beam splitter. Further, in FIG. 3, the transmittance characteristic in the P-polarized light is represented by the solid line, and the transmittance characteristic in the S-polarized light is represented by the dotted line. It should be noted that in FIG. 3, the wavelength $\lambda B0$ is a wavelength longer than the wavelength of the light beam BL and shorter than the shortest wavelength of the band of the fluorescence YL. Further, in FIG. 3, the wavelength $\lambda R1$ is equivalent to or slightly shorter than the shortest wavelength of the predetermined wavelength band of the red supplementary light beam RL, and the wavelength $\lambda R2$ is equivalent to or slightly longer than the longest wavelength of the predetermined wavelength band of the red supplementary light beam RL. In other words, it is desirable to make the band between the wavelength $\lambda R1$ and the wavelength $\lambda R2$ roughly coincide with the wavelength band (635 nm through 645 nm) of the red supplementary light beam RL.

Figure 4A:
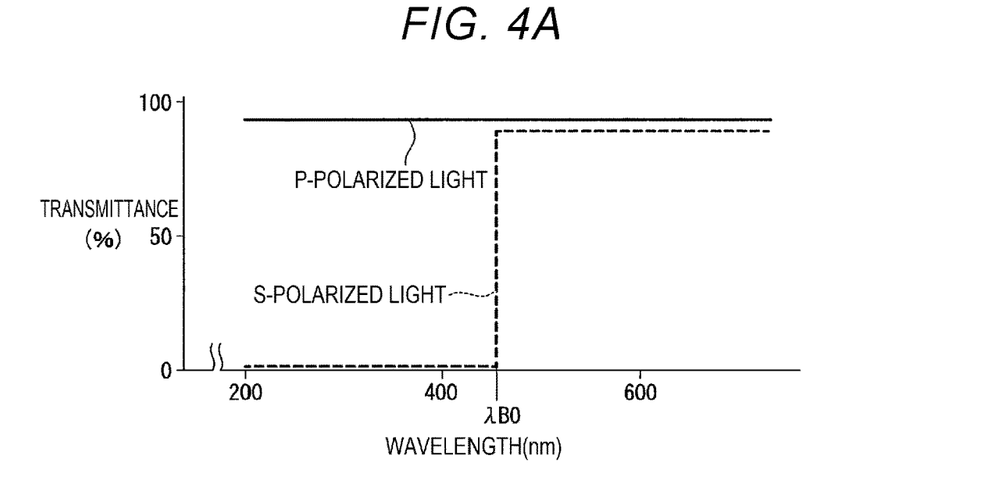
FIG. 4A is a diagram showing a filter constituting the polarization beam splitter.
Figure 4B:
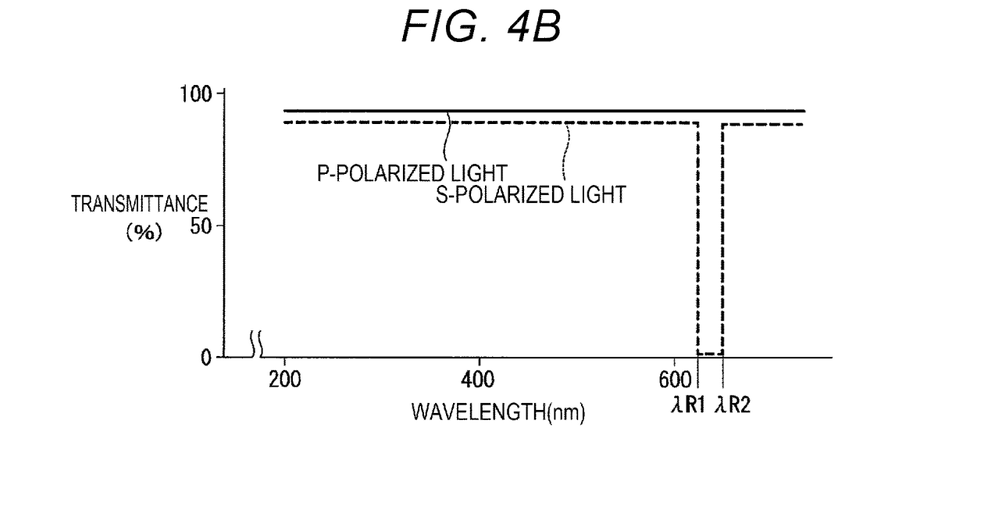
FIG. 4B is a diagram showing a filter constituting the polarization beam splitter.

As shown in FIG. 3, in the polarization beam splitter 25, the transmittance for the P-polarized light is as high as no lower than 90% throughout the entire visible range. In the polarization beam splitter 25, the transmittance for the S-polarized light is zero or roughly zero in the short wavelength band not longer than $\lambda B$, and the wavelength band between $\lambda R1$ and $\lambda R2$. Such a spectral transmittance characteristic can be realized by overlapping, for example, a filter having the characteristic shown in FIG. 4A and a filter having the characteristic shown in FIG. 4B with each other.

In the present embodiment, the polarization beam splitter 25 has a polarization split function of splitting the light beams BL from the blue laser emitting elements 21a into the light beams BLp (a blue first polarization component) as the P-polarized light with respect to the polarization beam splitter 25, and the light beams BLs (a blue second polarization component) as the S-polarized light. Thus, the light beams BLp as the P-polarized light are transmitted through the polarization beam splitter 25, and then proceed toward the diffusion element 50, and the light beams BLs as the S-polarized light are reflected by the polarization beam splitter 25, and then proceed toward the fluorescence emitting element 27. It should be noted that in the present disclosure, as the polarization beam splitter 25, it is possible to apply a plate-type or prism-type polarization beam splitter.

The light beams BLp as the P-polarized light transmitted through the polarization beam splitter 25 to proceed toward the diffusion element 50 enter the first wave plate 28a. The first wave plate 28a is formed of a quarter-wave plate disposed in the light path between the polarization beam splitter 25 and the diffusion element 50. The first wave plate 28a is disposed so as to provide a phase difference of a quarter wavelength to the light beams BL from the blue laser emitting elements 21a.

Therefore, the light beam BLp as the P-polarized light is converted by the first wave plate 28a into, for example, blue light beam BLc1 as clockwise circularly polarized light, and then enters the second light collection optical system 29. The second light collection optical system 29 is formed of, for example, a single lens. The blue light beams BLc1 having been transmitted through the second light correction optical system 29 enter the diffusion element 50.

The diffusion element 50 is disposed on the opposite side to the phosphor 34 in the polarization beam splitter 25, and diffusely reflects the blue light beams BLc1, which have been emitted from the second light collection optical system 29, toward the polarization beam splitter 25. A configuration of the diffusion element 50 will be described later.

Meanwhile, the red supplementary light beams RL emitted from the respective red laser emitting elements 40a enter the second collimator optical system 41. The second collimator optical system 41 converts the red supplementary light beams RL emitted from the respective red laser emitting elements 40a into parallel light. The second collimator optical system 41 is constituted by, for example, a plurality of collimator lenses 41a arranged in an array. The collimator lenses 41a are disposed so as to correspond respectively to the red laser emitting elements 40a.

The red supplementary light beams RL having been transmitted through the second collimator optical system 41 respectively enter the afocal optical system 42. The afocal optical system 42 is constituted by a convex lens 42a and a concave lens 42b, and reduces the beam diameter of the pencil including the plurality of red supplementary light beams RL.

The pencil including the plurality of red supplementary light beams RL, which is transmitted through the afocal optical system 42 to thereby be reduced in beam diameter, is transmitted through the second wave plate 28b, and then enters the polarization beam splitter 25 via the diffusion element 50 and the first wave plate 28a.

In the present embodiment, the direction in which the light (the red supplementary light beams RL) from the red laser emitting element 40a enters the polarization beam splitter 25 is the opposite direction to the direction in which the light (the light beams BL) having been emitted from the blue laser emitting elements 21a enters the polarization beam splitter 25.

In the present embodiment, the red laser emitting elements 40a and the blue laser emitting elements 21a are disposed so as to face each other across the polarization beam splitter 25. In other words, the red laser emitting elements 40a are disposed so as to be opposed to one surface side of the polarization beam splitter 25, and the blue laser emitting elements 21a are disposed so as to be opposed to the other surface side of the polarization beam splitter 25.

Here, the first wave plate 28a is disposed so as to provide a phase difference of a quarter wavelength to the light beams BL emitted from the blue laser emitting elements 21a as described above. Therefore, the phase difference provided to the red supplementary light beams RL different in wavelength band is shifted more than a quarter wavelength. Here, the second wave plate 28b of the present embodiment is set so as to provide the phase difference for converting the red supplementary light beam RL into the S-polarized light as a result of receiving the modulation action by the first wave plate 28a disposed on the posterior stage of the diffusion element 50. In other words, the phase difference characteristic of the second wave plate 28b is set so as to provide totally a half wavelength to the red supplementary light beams RL having sequentially been transmitted through the second wave plate 28b and the first wave plate 28a.

Hereinafter, the red supplementary light beams RL which are transmitted through the second wave plate 28b to thereby be converted into a predetermined polarization state are referred to as red supplementary light beams RL1. The red supplementary light beams RL1 enter the third light collection optical system 43. The red supplementary light beams RL1 are collected on the diffusion element 50 by the third light collection optical system 43. The red supplementary light beams RL1 are transmitted through the diffusion element 50 to thereby be diffused.

Figure 5:
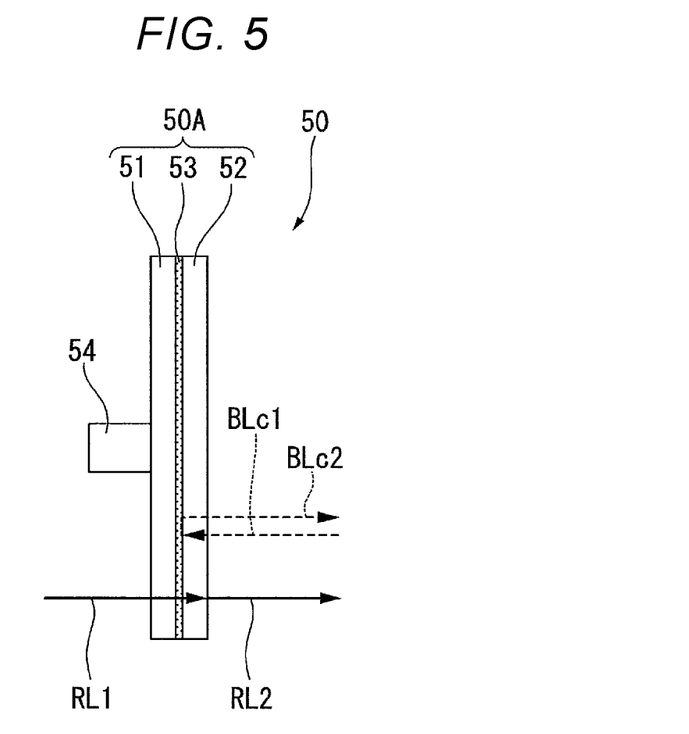
FIG. 5 is a cross-sectional view showing a configuration of a diffusion element.

FIG. 5 is a cross-sectional view showing a configuration of the diffusion element.

As shown in FIG. 5, the diffusion element 50 is provided with a diffusion plate 50A and a motor 54. The diffusion plate 50A has a first diffusion plate 51 and a second diffusion plate 52 functioning as diffusion layers, and a dichroic layer 53. The first diffusion plate 51 is disposed on the incident side of the light from the red laser emitting elements 40a in the dichroic layer 53. The second diffusion plate 52 is disposed on the incident side of the light from the blue laser emitting elements 21a in the dichroic layer 53. The dichroic layer 53 is disposed between the first diffusion plate 51 and the second diffusion plate 52. The first diffusion plate 51 and the second diffusion plate 52 each have a disk-like shape. The diffusion plate 50A has a disk-like shape in the state of being viewed from the front. The motor 54 rotates the diffusion plate 50A around a predetermined rotational axis.

The dichroic layer 53 has a property of transmitting the red supplementary light beams RL1 and reflecting the blue light beams BLc1.

The red supplementary light beams RL1 having entered the diffusion element 50 are transmitted through the first diffusion plate 51, the dichroic layer 53 and the second diffusion plate 52 to thereby be diffused. The blue light beams BLc1 having entered the diffusion element 50 are transmitted through the second diffusion plate 52 and then reflected by the dichroic layer 53 to thereby be transmitted through the second diffusion plate 52 once again, and are thus emitted as diffused light.

Here, when the red supplementary light beams RL1 are diffused by the diffusion element 50, the red supplementary light beams RL1 pass through the first diffusion plate 51 and the second diffusion plate 52, and therefor pass through the diffusion plate twice as a result. Further, when the blue light beams BLc1 are diffused by the diffusion element 50, the blue light beams BLc1 pass through the second diffusion plate 52 twice. In the present embodiment, the first diffusion plate 51 and the second diffusion plate 52 are formed of, for example, volume-type diffusion plates having equivalent thicknesses. According to this configuration, since the red supplementary light beams RL1 and the blue light beams BLc1 become roughly equal in the optical path length in the diffusion plate, the degree of diffusion by the diffusion element 50 can be made roughly equivalent between the red supplementary light beams RL1 and the blue light beams BLc1.

It should be noted that a surface diffusion-type diffusion plate can also be used as each of the first diffusion plate 51 and the second diffusion plate 52. In this case, it is sufficient to adjust the number of diffusion surfaces which exert the diffusion action on the red supplementary light beams RL1 and the number of diffusion surfaces which exert the diffusion action on the blue light beams BLc1 to be the same. For example, by providing the diffusion function to the both surfaces of the second diffusion plate 52, the blue light beams BLc1 are subject to the diffusion action by three surfaces in the period from when entering the diffusion element 50 to when being emitted from the diffusion element 50. On the other hand, the red supplementary light beams RL are subject to the diffusion action by two surfaces when being transmitted through the second diffusion plate 52, and therefore, it is sufficient to provide the diffusion function to either one of the surfaces of the first diffusion plate 51. According to this configuration, since the red supplementary light beams RL1 and the blue light beams BLc1 are each subject to the diffusion action by three surfaces, the degree of diffusion by the diffusion element 50 can be made roughly equivalent between the red supplementary light beams RL and the blue light beams BLc1.

In the present embodiment, the light obtained by reflecting the blue light beams BLc1 with the diffusion element 50 is referred to as blue light beams BLc2. For example, the blue light beams BLc1 as the clockwise circularly polarized light are reflected by the diffusion element 50 as the blue light beams BLc2 as counterclockwise circularly polarized light. The blue light beams BLc2 are converted by the second light collection optical system 29 into parallel light, and then enter the first wave plate 28a once again.

Further, the light which has been diffusely reflected by the diffusion element 50 and then converted into the light in a different polarization state via the first wave plate 28a is referred to as blue diffused light BLs1. According to the present embodiment, the blue light beams BLc2 as the counterclockwise circularly polarized light are converted by the first wave plate 28a into the blue diffused light BLs1 as S-polarized light. The blue diffused light BLs1 as the S-polarized light is reflected by the polarization beam splitter 25 toward the lens integrator 31.

Further, in the present embodiment, the light obtained by transmitting the red supplementary light beams RL1 through the diffusion element 50 to thereby diffuse the red supplementary light beams RL1 is referred to as red diffused light RL2. The red diffused light RL2 is converted by the second light collection optical system 29 into parallel light, and is then transmitted through the first wave plate 28a. As described above, the red supplementary light beams RL are transmitted through the second wave plate 28b and the first wave plate 28a to thereby be provided with the phase difference of a half wavelength, and are thus converted into S-polarized light. In the present embodiment, the light as the S-polarized light obtained by transmitting the red diffused light RL2 through the first wave plate 28a is referred to as red diffused light RL2s. The red diffused light RL2s as the S-polarized light enters the polarization beam splitter 25.

As shown in FIG. 3, the polarization beam splitter of the present embodiment has a polarization split characteristic of transmitting the P-polarized light and reflecting the S-polarized light in the wavelength band of the red supplementary light beams RL which is the light emitted from the red laser emitting elements 40a. The red diffused light RL2 as the diffused light of the red supplementary light beams RL is the S-polarized light with respect to the polarization beam splitter 25, and therefore the red diffused light RL2s is reflected by the polarization beam splitter 25. As a result, the red diffused light RL2s proceeds toward the lens integrator 31 together with the blue diffused light BLs1.

Further, the light beams BLs as the S-polarized light having been emitted by the blue array light source 21, and then reflected by the polarization beam splitter 25 enter the first light collection optical system 26. In the present embodiment, the first light collection optical system 26 is constituted by, for example, a first lens 26a and a second lens 26b. The light beams BLs via the homogenizer optical system 23 and the first light collection optical system 26 enter the area to be illuminated of the fluorescence emitting element 27 in the state in which the illuminance distribution is homogenized. The fluorescence emitting element 27 has the phosphor 34, a substrate 35 for supporting the phosphor 34, and a fixation member 36 for fixing the phosphor 34 to the substrate 35.

In the present embodiment, the phosphor 34 is fixed to the substrate 35 with the fixation member 36 disposed between a side surface of the phosphor 34 and the substrate 35. The phosphor 34 has contact with the substrate 35 in a surface on an opposite side to the side which the light beams BLs enter. It should be noted that the substrate and the fixation member 36 each have a light transmissive property.

The phosphor 34 absorbs the light beams BLs as the excitation light to thereby be excited. The phosphor 34 excited by the light beams BLs emits the fluorescence YL in the wavelength band of, for example, 500 through 700 nm.

On the opposite side of the phosphor 34 to the side which the light beams BLs enter (on the opposite side to the first light collection optical system 26), there is disposed a reflecting section 37. The reflecting section 37 reflects a component proceeding toward the substrate 35 out of the fluorescence YL generated by the phosphor 34.

On a surface of the substrate 35 on the opposite side to the surface for supporting the phosphor 34, there is disposed a heatsink 38. In the fluorescence emitting element 27, since heat radiation can be achieved through the heatsink 38, the heat deterioration of the phosphor 34 can be prevented.

A part of the fluorescence YL generated by the phosphor 34 is reflected by the reflecting section 37, and is then emitted to the outside of the phosphor 34. Further, another part of the fluorescence YL generated by the phosphor 34 is emitted to the outside of the phosphor 34 without the intervention of the reflecting section 37. In such a manner, the fluorescence YL is emitted from the phosphor 34 toward the first light collection optical system 26. The flux of the fluorescence YL is collimated by the first light collection optical system 26, and then enters the polarization beam splitter 25.

The fluorescence YL includes green light KG and red light KR as wavelength components. The red light KR included in the fluorescence YL includes a first red fluorescence component KR1 having a wavelength band (a predetermined wavelength band) of 635 nm through 643 nm as a peak wavelength band of the red supplementary light beams RL, and a second red fluorescence component KR2 having a wavelength other than the predetermined wavelength band. Further, as described above, the polarization beam splitter 25 has a polarization split function with respect to the red light in the band of 635 nm through 645 nm. Therefore, the polarization beam splitter 25 has the polarization split function with respect to a component in the predetermined wavelength band as a part of the red light KR, namely the first red fluorescence component KR1 having the wavelength band of 635 nm through 645 nm. Here, the first red fluorescence component KR1 corresponding to the predetermined wavelength band corresponds to a component in the band between the wavelength λR1 and the wavelength λR2 shown in FIG. 3.

Specifically, the polarization beam splitter 25 of the present embodiment has the polarization split function of splitting the first red fluorescence component KR1 out of the red light KR into a red P-polarization component (a first red polarization component) KR1p as P-polarized light with respect to the polarization beam splitter 25, and a red S-polarization component (a second red polarization component) KR1s as S-polarized light with respect to the polarization beam splitter 25.

The red P-polarization component KR1p is transmitted through the polarization beam splitter 25, and at the same time, the red S-polarization component KR1s is reflected by the polarization beam splitter 25. The red S-polarization component KR1s reflected by the polarization beam splitter 25 is not used as the illumination light WL described later.

In contrast, the polarization beam splitter 25 does not have the polarization split function with respect to most components except the first red fluorescence component KR1 out of the fluorescence YL, namely a principal fluorescence component YL1. Here, the principal fluorescence component YL1 includes the second red fluorescence component KR2 except the first red fluorescence component KR1 out of the red light KR, and the green light KG. The principal fluorescence component YL1 is transmitted through the polarization beam splitter 25 to thereby proceed toward the lens integrator 31.

In the polarization beam splitter 25 of the present embodiment, only the red S-polarization component KR1s out of the fluorescence YL fails to be used as the illumination light WL. In other words, although the red S-polarization component KR1s becomes the light loss, the red S-polarization component KR1s is narrow in band, and has a minute proportion to the whole of the fluorescence YL, and therefore, it is conceivable that the light loss of the red component of the fluorescence YL is extremely small from the viewpoint of the whole of the light source device 2. Further, the loss by the red S-polarization component KR1s can be compensated by the red supplementary light beams RL emitted from the red supplementary light source 40. Therefore, in the light source device 2 according to the present embodiment, the use efficiency of the red component of the fluorescence YL becomes higher than before. In addition, the necessary compensation is performed by the red supplementary light source 40.

It should be noted that it is desirable to make the band between the wavelength $\lambda R1$ and the wavelength $\lambda R2$ shown in FIG. 3 and the wavelength band of the red supplementary light beams RL completely coincide with each other. By achieving the above, the amount of the red S-polarization component KR1s which fails to be used as the illumination light can be kept to a minimum.

The polarization beam splitter 25 of the present embodiment emits the blue diffused light BLs1 and the red diffused light RL2s diffused by the diffusion element 50, the red P-polarization component KR1p split from the first red fluorescence component KR1 by the polarization split, and the principal fluorescence component YL1 (the second red fluorescence component KR2 and the green light KG) in one direction (a direction toward the lens integrator 31). In other words, the blue diffused light BLs1, the red diffused light RL2s and a part (the green light KG, the second red fluorescence component KR2 and the red P-polarization component KR1p) of the fluorescence YL are emitted from the polarization beam splitter 25.

The polarization beam splitter 25 according to the present embodiment combines the blue diffused light BLs1, the red diffused light RL2s and the part (the green light KG, the second red fluorescence component KR2 and the red P-polarization component KR1p) of the fluorescence YL with each other to emit the result as the illumination light WL. In the present embodiment, the red diffused light RL2s corresponds to the total flux (100%) of the red supplementary light beams RL emitted from the red supplementary light source 40.

The illumination light WL is emitted toward the lens integrator 31. The lens integrator 31 has a first multi-lens 31*a* and a second multi-lens 31*b*. The first multi-lens 31*a* has a plurality of first small lenses 31*am* for dividing the illumination light WL into a plurality of partial light beams.

The lens surface (the surface of the first small lenses 31*am*) of the first multi-lens 31*a* and the image formation area of each of the light modulation devices 4R, 4G and 4B are conjugated with each other. Therefore, the shape of each of the first small lenses 31*am* is a roughly similar shape (a rectangular shape) to the shape of each of the image formation areas of the light modulation devices 4R, 4G and 4B. Thus, each of the partial light beams emitted from the first multi-lens 31*a* efficiently enters each of the image formation areas of the light modulation devices 4R, 4G and 4B.

The second multi-lens 31*b* has a plurality of second small lenses 31*bm* corresponding respectively to the first small lenses 31*am* of the first multi-lens 31*a*. The second multi-lens 31*b* forms an image of each of the first small lenses 31*am* of the first multi-lens 31*a* in the vicinity of each of the image formation areas of the respective light modulation devices 4R, 4G and 4B in cooperation with the superimposing lens 33.

The illumination light WL having been transmitted through the lens integrator 31 enters the polarization conversion element 32. The polarization conversion element 32 is constituted by polarization split films and wave plates (half-wave plates) arranged in an array. The polarization conversion element 32 converts the polarization direction of the illumination light WL into a predetermined direction. More specifically, the polarization conversion element 32 makes the polarization direction of the illumination light WL correspond to the direction of the transmission axis of the polarization plate (not shown) disposed on the light incident side of each of the light modulation devices 4R, 4G and 4B. Thus, the polarization direction of the red light LR, the green light LG and the blue light LB obtained by splitting the illumination light WL as described above corresponds to the transmission axis direction of the incident side polarization plate of each of the light modulation devices 4R, 4G and 4B. Therefore, the red light LR, the green light LG and the blue light LB are respectively guided to the image formation areas of the light modulation devices 4R, 4G and 4B in good condition without being blocked by the incident side polarization plates, respectively.

The illumination light WL having been transmitted through the polarization conversion element 32 enters the superimposing lens 33. The superimposing lens 33 homogenizes the illuminance distribution due to the illumination light WL in the area to be illuminated in cooperation with the lens integrator 31.

As described above, according to the light source device 2 of the present embodiment, by reflecting the red supplementary light beams RL emitted from the red supplementary light source 40 using the polarization beam splitter 25, it is possible to generate the red light LR of the illumination light WL using 100% of the red supplementary light beams RL.

Further, in the light source device 2 according to the present embodiment, since the loss (the red S-polarization component KR1s) of the fluorescence YL in the polarization beam splitter 25 is small, the output of the red supplementary light beams RL used for compensating the loss can be kept in a low level. Therefore, by efficiently assisting the red light LR, it is possible to generate the white illumination light WL having the optimum white balance.

Further, in the light source device 2 according to the present embodiment, by adjusting the output of the red supplementary light beams RL emitted from the red supplementary light source 40, it is possible to arbitrarily control the assist amount of the red component (the red light LR) of the illumination light WL. Therefore, it is possible to efficiently generate the red light LR having a desired tint.

Further, in the light source device 2 according to the present embodiment, by providing the phase difference of a half wavelength to the red supplementary light beams RL as the P-polarized light transmitted through the second wave plate 28b and the first wave plate 28a, it is possible to convert the red supplementary light beams RL into the S-polarized light. Therefore, the red diffused light RL2 via the second wave plate 28b and the first wave plate 28a, and the diffusion element 50 can be reflected by the polarization beam splitter 25 to thereby efficiently be used as the illumination light WL.

Further, in the light source device 2 according to the present embodiment, since the red laser emitting elements 40a and the blue laser emitting elements 21a are disposed so as face each other across the polarization beam splitter 25, there is achieved the configuration in which the red supplementary light beams RL and the light beams BL enter the polarization beam splitter 25 in the respective direction opposite to each other. Therefore, since it is possible to dispose the red laser emitting elements 40a and the blue laser emitting elements 21a separately from each other, the problem that the interference is caused by the red laser emitting elements 40a and the blue laser emitting elements 21a approaching each other can be prevented from occurring.

Further, in the light source device 2 according to the present embodiment, it is possible to diffuse the light beams BL from the blue laser emitting elements 21a and the red supplementary light beams RL from the red laser emitting elements 40a with the single diffusion element 50. Therefore, compared to a configuration of respectively providing diffusely reflecting elements, it is possible to achieve reduction in cost of the light source device 2.

Further, in the light source device 2 according to the present embodiment, since the light source device 2 has the diffusion element 50 provided with the first diffusion plate 51, the second diffusion plate 52 and the dichroic layer 53, the degree of diffusion by the diffusion element 50 can be made roughly equivalent between the red supplementary light beams RL and the blue light beams BLc1. Therefore, since the diffused light (the blue diffused light BLs1 and the red diffused light RL2s) of the red supplementary light beams RL and the blue light beams BLc1 approximates to the emission distribution of the fluorescence YL, the illumination light WL obtained by combining the blue diffused light BLs1, the red diffused light RL2s and the fluorescence YL with each other can be made difficult to cause color unevenness in the display image.

Further, according to the light source device 2 of the present embodiment, by rotating the wave plate 24, it is possible to change the ratio between the S-polarized light (the light beams BLs) and the P-polarized light (the light beams BLp) to thereby adjust the ratio between the fluorescence YL and the blue diffused light BLs1. Therefore, the color balance (the white balance) of the illumination light WL can be adjusted to a desired value.

Further, according to the projector 1 of the present embodiment, since the light source device 2 described above is provided, the red light LR is sufficiently supplemented, and therefore, it becomes possible to generate the white light having the optimum white balance.

It should be noted that the present disclosure is not limited to the contents of the embodiment described above, but can arbitrarily be modified within the scope or the spirit of the present disclosure.

For example, in the embodiment described above, it is also possible to reverse the positions of the diffusion element 50 and the phosphor 34 with respect to the polarization beam splitter 25. Specifically, it is possible to adopt a configuration in which the light beams BLs (the second component of the blue laser beam) as S-polarized light reflected by the polarization beam splitter 25 are made to enter the diffusion element 50, and the light beams BLp (the first component of the blue laser beam) as P-polarized light transmitted through the polarization beam splitter 25 are made to enter the phosphor 34 as the excitation light. In this case, the red laser emitting elements 40a each emit the light having the same polarization direction as the S-polarized light (the light beam BLs) of the light beam BL obtained by performing the polarization split in the polarization beam splitter 25 as the red supplementary light beam RL.

Further, in the embodiment described above, it is also possible to dispose a homogenizer optical system between the red supplementary light source 40 and the third light collection optical system 43. According to this configuration, it is possible to improve the homogeneity of the illuminance distribution of the red supplementary light beams RL on the diffusion element 50.

Further, although in the embodiment described above, there is described the example of installing the light source device according to the present disclosure in the projector, this is not a limitation. The light source device according to the present disclosure can also be applied to lighting equipment, a headlight of a vehicle, and so on.

What is claimed is:

1. A light source device comprising:
   a blue laser emitting element configured to emit blue light;
   a red laser emitting element configured to emit red light having a predetermined wavelength band;
   a phosphor excited by excitation light to emit fluorescence;
   a polarization split element having a polarization split function with respect to the blue light and the red light having the predetermined wavelength band; and
   a diffusion element including a diffusion layer configured to diffuse incident light, and a dichroic layer configured to reflect the blue light and transmit the red light, wherein
   the blue light emitted from the blue laser emitting element enters the polarization split element to be split into a first blue polarization component and a second blue polarization component,
   the first blue polarization component enters the diffusion element to be diffusely reflected to turn to blue diffused light,
   the second blue polarization component enters the phosphor as the excitation light,
   the phosphor is excited by the second blue polarization component to emit the fluorescence,
   the red light emitted from the red laser emitting element enters the diffusion element to be diffusely transmitted to turn to red diffused light, and
   the blue diffused light, the red diffused light and the fluorescence enter the polarization split element, and the blue diffused light, the red diffused light and a part of the fluorescence are combined with each other, and then emitted from the polarization split element.

2. The light source device according to claim 1, wherein the fluorescence emitted from the phosphor includes red light and green light, the red light included in the fluorescence includes a first red fluorescence component having a predetermined wavelength band, and a second red fluorescence component having a wavelength other than the predetermined wavelength band, and the polarization split element performs polarization split on the first red fluorescence component.

3. The light source device according to claim 2, wherein the first red fluorescence component is split by the polarization split element into a first red polarization component and a second red polarization component.

4. The light source device according to claim 3, wherein a part of the fluorescence is formed of the green light, the second red fluorescence component and the first red polarization component.

5. The light source device according to claim 1, further comprising:
- a first wave plate disposed between the polarization split element and the diffusion element; and
- a second wave plate which is disposed between the diffusion element and the red laser emitting element, and which the red light emitted from the red laser emitting element enters.

6. The light source device according to claim 5, wherein the blue light emitted from the blue laser emitting element is transmitted through the first wave plate, and is provided with a phase difference of a quarter wavelength by the first wave plate, and the red light emitted from the red laser emitting element is transmitted through the second wave plate and the first wave plate, and is provided with a phase difference of a half wavelength by the second wave plate and the first wave plate.

7. The light source device according to claim 1, wherein the diffusion layer includes a first diffusion plate disposed at an incident side of light from the red laser emitting element in the dichroic layer, and a second diffusion plate located at an incident side of light from the blue laser emitting element in the dichroic layer.

8. The light source device according to claim 1, wherein a direction in which the light from the red laser emitting element enters the polarization split element is an opposite direction to a direction in which the light from the blue laser emitting element enters the polarization split element.

9. The light source device according to claim 1, wherein the red laser emitting element and the blue laser emitting element are disposed so as to face each other across the polarization split element.

10. A projector comprising:
the light source device according to claim 1;
a light modulation device configured to modulate light emitted from the light source device in accordance with image information to thereby form image light; and
a projection optical system configured to project the image light.

11. A projector comprising:
the light source device according to claim 2;
a light modulation device configured to modulate light emitted from the light source device in accordance with image information to thereby form image light; and
a projection optical system configured to project the image light.

12. A projector comprising:
the light source device according to claim 3;
a light modulation device configured to modulate light emitted from the light source device in accordance with image information to thereby form image light; and
a projection optical system configured to project the image light.

13. A projector comprising:
the light source device according to claim 4;
a light modulation device configured to modulate light emitted from the light source device in accordance with image information to thereby form image light; and
a projection optical system configured to project the image light.

14. A projector comprising:
the light source device according to claim 5;
a light modulation device configured to modulate light emitted from the light source device in accordance with image information to thereby form image light; and
a projection optical system configured to project the image light.

15. A projector comprising:
the light source device according to claim 6;
a light modulation device configured to modulate light emitted from the light source device in accordance with image information to thereby form image light; and
a projection optical system configured to project the image light.

16. A projector comprising:
the light source device according to claim 7;
a light modulation device configured to modulate light emitted from the light source device in accordance with image information to thereby form image light; and
a projection optical system configured to project the image light.

17. A projector comprising:
the light source device according to claim 8;
a light modulation device configured to modulate light emitted from the light source device in accordance with image information to thereby form image light; and
a projection optical system configured to project the image light.

18. A projector comprising:
the light source device according to claim 9;
a light modulation device configured to modulate light emitted from the light source device in accordance with image information to thereby form image light; and
a projection optical system configured to project the image light.

* * * * *